May 1, 1928.
R. S. SANFORD
1,668,338
VEHICLE BRAKE
Filed Aug. 15, 1922
2 Sheets-Sheet 1
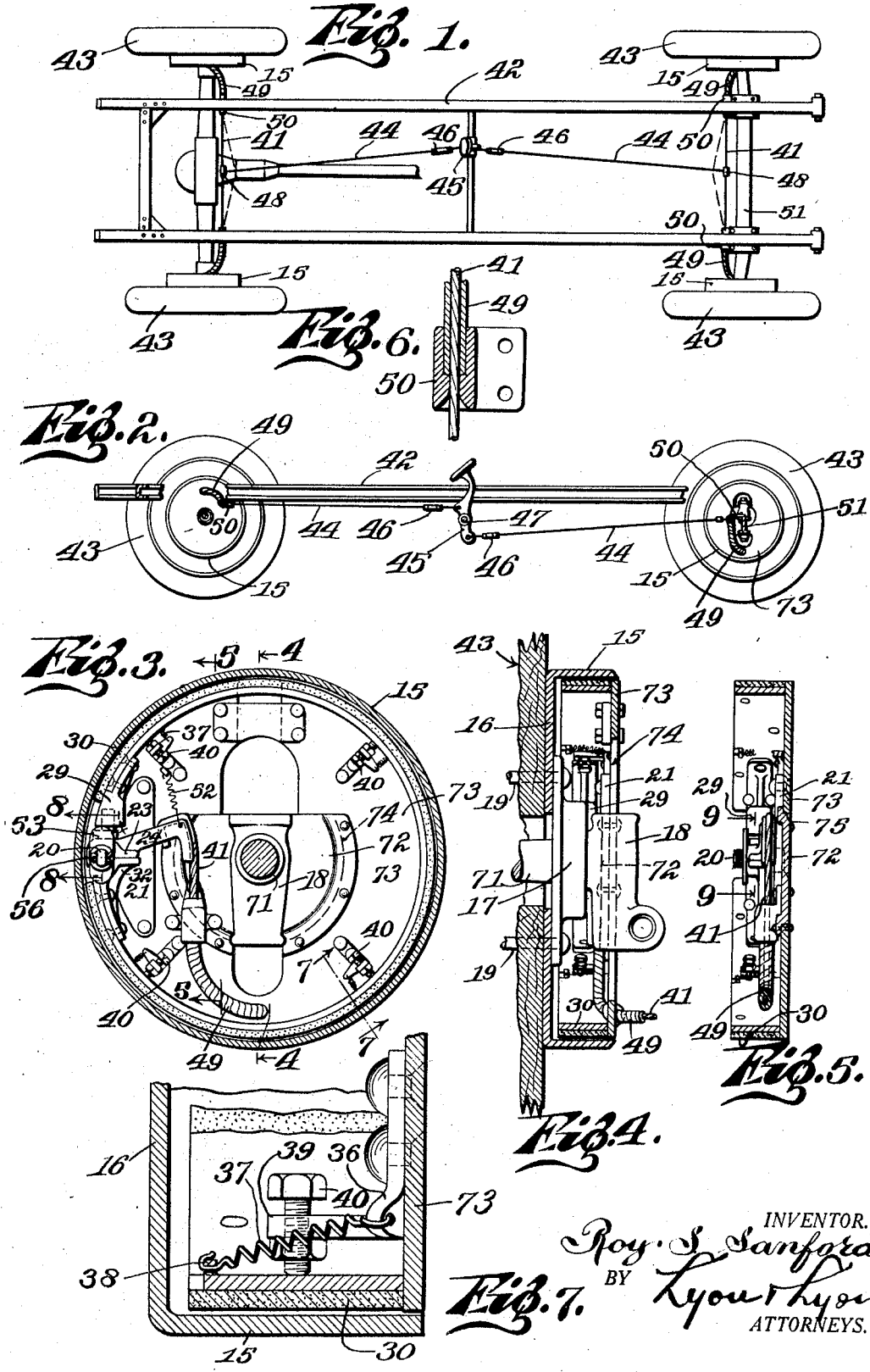
INVENTOR.
Roy S. Sanford
BY
Lyon & Lyon
ATTORNEYS.

May 1, 1928.
R. S. SANFORD
1,668,338
VEHICLE BRAKE
Filed Aug. 15, 1922
2 Sheets-Sheet 2
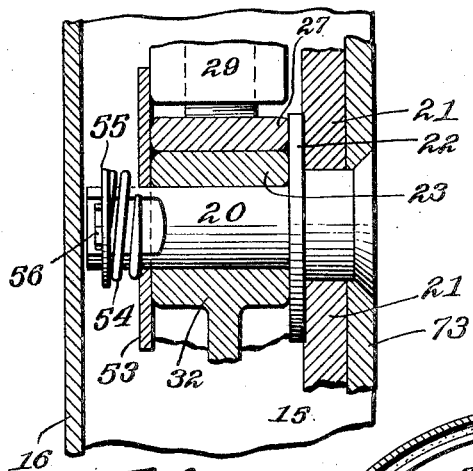
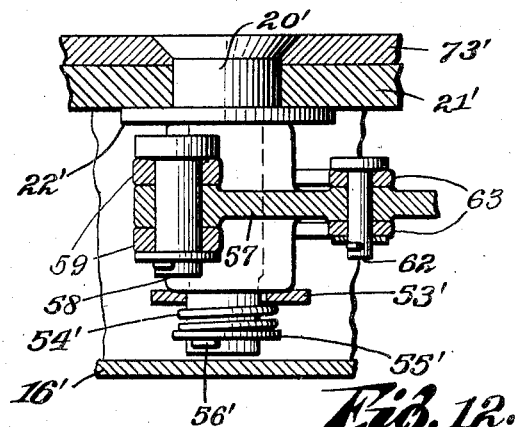
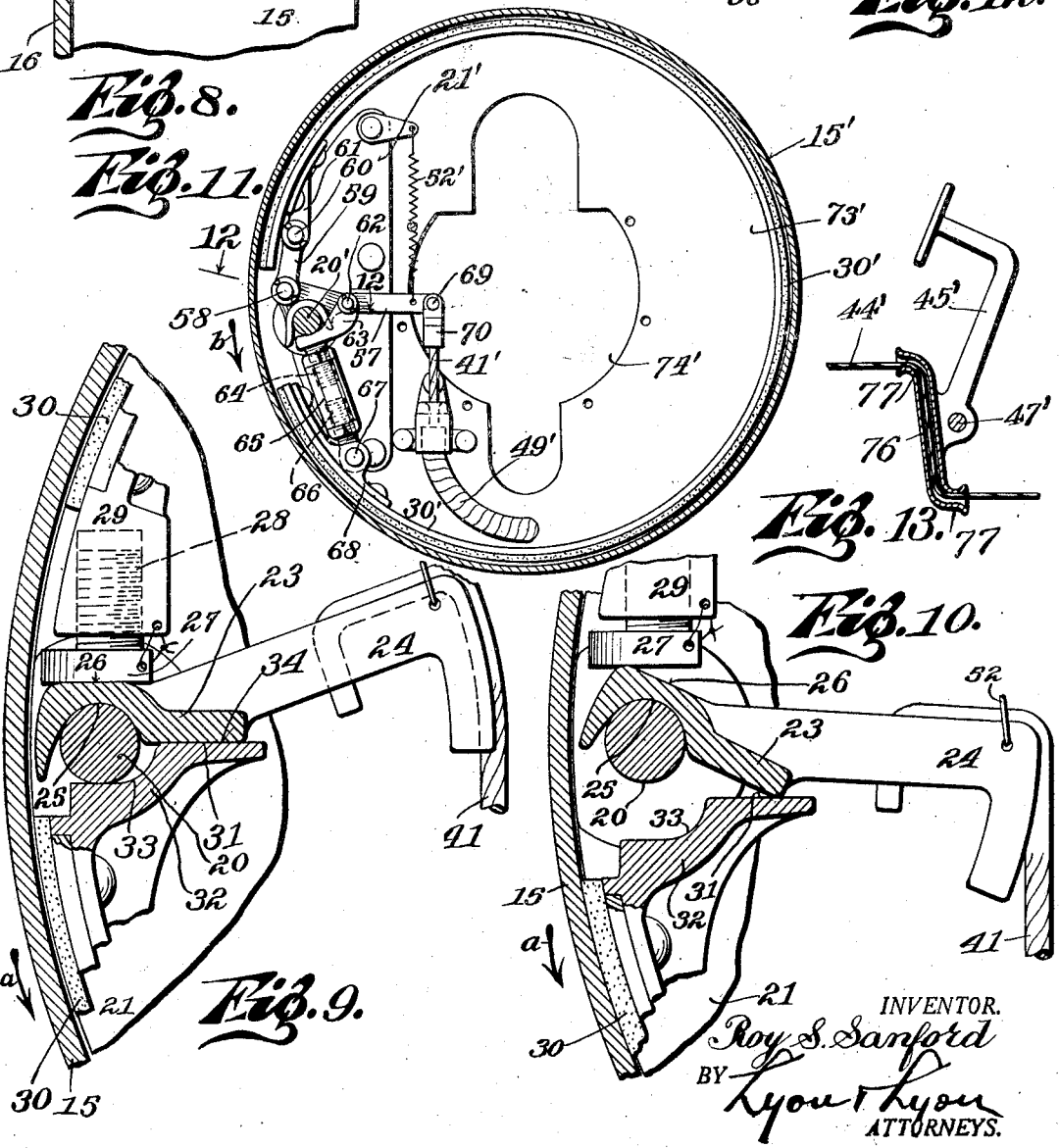
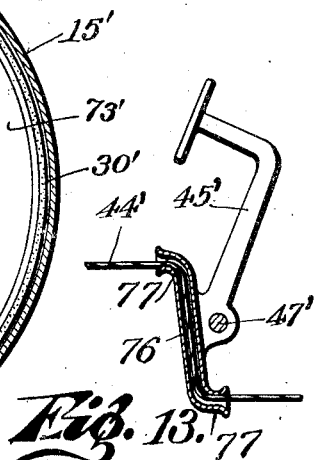
INVENTOR.
Roy S. Sanford
BY Lyon & Lyon
ATTORNEYS.

Patented May 1, 1928.

1,668,338

UNITED STATES PATENT OFFICE.

ROY S. SANFORD, OF PASADENA, CALIFORNIA, ASSIGNOR, BY MESNE ASSIGNMENTS, TO BENDIX BRAKE COMPANY, OF CHICAGO, ILLINOIS, A CORPORATION OF ILLINOIS.

VEHICLE BRAKE.

Application filed August 15, 1922. Serial No. 581,945.  REISSUED

This invention relates to vehicle brakes of the type whereof the opposite ends of the brake band are moved in opposite directions in effecting the braking action.

An object of the invention is to produce a brake of simple and effective construction.

A very important object of the invention is to make provision for equalizing the friction in a plurality of brakes between the brake bands and the drums.

Equalization of the braking pressure in a plurality of brakes has been heretofore effected by various constructions, but it will be understood that the mere equalization of such braking pressures does not equalize the braking action of the several brakes. This could only occur with such constructions if the frictional surfaces were uniform in the several brakes, but this is almost an impossibility as one brake band will always tend to seize harder than another. The disproportion between the amount of friction in the different brakes is liable to increase as the brake bands wear.

To effect equalization of the braking action, there is provided mechanism that operates when the friction is equal in the different brakes to thrust the brake bands against the brake drums with the same degree of pressure and that also operates when the friction tends to be unequal to effect as much greater pressure on the brake band exerting the less friction and as much less pressure on the band exerting the greater friction as will substantially equalize the friction in the different brakes so that the braking action of the tires upon the road will be as nearly alike as possible. This, as will be clear, avoids the tendency to skidding.

Another important feature of the invention relates to the use of means, such as a cable or other tension element, directly connected to a simple operating device for the brake friction means, preferably by extending the cable inside the brake drum and there connecting it to the operating device. In one very desirable arrangement, a flexible Bowden-type conduit has its end secured to a stationary plate at the open side of the drum, and the cable extends through this conduit and beyond the end of the conduit into the brake drum, where it is connected to a simple brake-operating device.

I also consider that my invention comprises, as a feature which is broadly new, the combination of a flexible tension element, for example the above-described cable, with a brake-operating device which can shift to allow one part of the friction device to anchor when the drum is turning in one direction and a different part to anchor when the drum is turning in the other direction, thus increasing the effectiveness of the friction means without complicating the operating mechanism. Preferably the brake is adjusted to compensate for wear, and thereby avoid undue movement from the one anchorage to the other, by an adjustable device at one end, and which is illustrated as transmitting the braking torque to the brake anchor, and which may, according to my invention, be adjusted without affecting either the anchorage or the operating means.

Other features and objects of the invention, including the novel structure and arrangement of the operating means, and other new combinations of parts and desirable particular constructions, will be apparent from the following description of the illustrative embodiments shown in the accompanying drawings, in which:

Figure 1 is a plan view of a chassis provided with the invention.

Fig. 2 is a longitudinal section of Fig. 1, portions of the far frame member being broken away.

Fig. 3 is an elevation of the left front brake looking from the wheel side, the brake drum and axle being shown in section.

Fig. 4 is a sectional elevation on the line indicated by 4—4 Fig. 3, a fragment of the wheel also being shown.

Fig. 5 is a sectional elevation on the line indicated by 5—5 Fig. 3.

Fig. 6 is an enlarged sectional detail of the operating cable, one of the sleeves therefor and the sleeve-supporting bracket.

Fig. 7 is an enlarged sectional elevation from the line indicated by 7—7 Fig. 3.

Fig. 8 is an enlarged sectional detail on the line indicated by 8—8 Fig. 3.

Fig. 9 is an enlarged fragmental sectional detail on the line indicated by 9—9 Fig. 5, the parts being shown in position with the brake band contracted.

Fig. 10 is an enlarged fragmental sectional detail similar to Fig. 9 showing the parts in position for expanding the brake band.

Fig. 11 is an elevation, similar to Fig. 3, of a modified form of brake embodying the invention.

Fig. 12 is an enlarged sectional detail on the line indicated by 12—12 Fig. 11.

Fig. 13 is a side elevation of a brake-operating member of different construction than shown in Figs. 1 and 2, a fragment of the cable operated thereby also being shown engaging the sleeve.

Referring first to the form of the invention illustrated in Figs. 1 to 10, inclusive, there is provided a brake drum 15 having an integral end plate or head 16 and a substantially cylindrical braking flange. Inside of the drum 15 is a hub 17 through which extends the stub shaft 71 of the steering knuckle 18. Bolts 19 pass through the hub 17, through the head 16 and through the hub of the vehicle wheel to secure the brake drum to said wheel.

The steering knuckle 18 is provided with a flange 72 having its periphery concentric with the stub shaft 71 so that said flange can be turned off in a lathe, the radius of said flange being greater than the distance from the axis of the shaft to the upper or lower end of the knuckle. To the flange 72 is bolted a face plate 73 having a central orifice 74 and arranged at the open side of the brake drum. The flange 72 is provided with a shoulder 75 fitting the orifice 74 and said flange overlaps the inner face of the plate 73 adjacent the orifice 74. Thus the flange and plate are flush at their outer faces. The plate 73 is provided near its periphery with an inwardly projecting stud or anchor 20 and said plate is reinforced at this point by a plate 21. A shoulder 22 on the stud 20 is seated against the inner face of the plate 21.

The stud 20 constitutes a pivot for a novel cam 23 which is formed on one end of a lever 24. The cam 23 is recessed at 25 to fit part way around the stud 20 so that the cam will pivot on the stud. The upper cam face 26 of the cam engages a block 27 which is provided with a threaded stud 28 adjustably engaging an ear or fitting 29 that is secured to one end of an internal brake band 30. By turning the block 27 the same is adjusted toward or from the ear 29 for adjustably expanding or contracting the brake band relative to the drum. It will be observed that block 27 constitutes an adjusting device for compensating for the wear of the brake without affecting either the anchorage or the operating means of the brake; also, that the braking torque in one direction of rotation of the drum is transmitted through the adjusting device to the stud or anchor 20.

The under cam face 31 of the cam rides upon an ear or fitting 32 which is secured to the other end of the brake band 30. The ear 32 is provided with a recess 33 to accommodate a portion of the stud 20 when the face 31 of the cam is in full contact with a flat face 34 of the ear 32.

To the inner face of the plate 73 are secured eyes 36 to each of which is secured one end of a spring 37. The other ends of the springs 37 are fastened to eyes 38 on the inner face of the brake band. These springs serve to normally hold the brake band spaced from the brake drum to prevent dragging of the brake band on said drum when the brake is off. The eyes 36 are in the form of angular brackets and the legs 39 of said brackets extend parallel with the periphery of the brake drum and are provided with adjusting screws 40 bearing against the inner face of the brake band to limit contraction of said band produced by the springs 37. To the lever 24 is secured the operating cable 41; preferably the cable passes over an arc at the end of the lever so that the leverage does not change.

Now referring more particularly to Figs. 1 and 2 of the drawings there will be seen a vehicle frame 42 supported by wheels 43. Each of the wheels 43 is provided with a brake constructed as above described. The cables 41, connecting the brakes of the wheels on opposite sides, are connected by cables 44 to a brake operating member such as the usual service pedal 45, said cables being provided with turnbuckles 46 for adjustment purposes. The cables 44 are connected to the brake operating member 45 on opposite sides of the fulcrum 47 of said member so that when said member is pushed forwardly by the operator both cables 44 will be pulled to set each of the four brakes. The cables 44 are connected with the cables 41 by sleeves 48 mounted on the cables 41. The cables 41 pass through flexible sleeves such Bowden-type conduits 49 and through brackets 50 which are fixed to suitable supports. In the instance shown in the drawings the front brackets 50 are fixed to the front axle 51 and the rear brackets to the frame 42. The sleeves 49 are inserted at one end in the brackets 50, as clearly shown in Fig. 6. At the ends adjacent the brakes, sleeves or conduits 49 pass adjacent the swiveling axes of the wheels, where they are secured to backing plates 73 by suitable fittings, and are fixedly secured at their ends to the backing plates by suitable fixed brackets mounted thereon. The cables or tension elements 41 pass beyond the ends of the sleeves or conduits 49 to their connection with the operating devices 24.

The invention above described operates as follows: When the driver of the vehicle presses upon the brake operating member 45, a pull is exerted on the cables 44 so as to depress the cable ends of the levers 24. This causes each cam 23 to move from the position shown in Fig. 9 to that shown in Fig. 10, opposite points of the cam riding against the block 27 and the ear 32, respectively, so as to force the opposite ends of the brake band away from each other, thus expanding said band against the inner face of the brake drum in a manner readily understood.

As the cam 23 turns on the abutment 20 in applying the brake, when the vehicle is moving forward, the shape of the cam is such as to force the fitting 29 somewhat upwardly, but nevertheless this fitting remains anchored through cam 23 on abutment 20 throughout the operation of applying the brake, whereas cam 23 pries the fitting 32 downwardly away from abutment 20 until the brake is fully applied. Thus there is in the forward direction no shifting of the anchorage during or after the application of the brake. In reverse, however, the drum friction shifts the entire brake assembly to bring fitting 32 back into anchoring engagement with abutment 20. When the brake is properly adjusted, however, this shifting is not great, and it takes place as soon as the friction means engages the drum and before the brake is fully applied, and is therefore not noticeable in practice.

Let it be assumed that the vehicle is traveling forwardly and that, in consequence, the brake drum in Figs. 9 and 10 is traveling in the direction of the arrow a. In each brake the lever arm operating against the ear 32 is longer than that operating against the block 27 and hence the tendency is to move the ear 32 a greater distance than the block 27. The resistance to expansion of the brake band is less at the ear 32 than at the ear 29 since the rotation of the brake band is in the direction of expansion movement of the band toward said drum. The tendency is for the brake drum to rotate the band in a direction to move the block 27 toward the stud 20 to retract the lever 24. It will now be seen that if the degree of friction between the brake band and the drum is greater in one of the brakes than in any of the others the tendency to rotation of the brake band in the brake having the greater friction will be greater than of the brake band in the brake having the lesser friction and, consequently, that band having the greater friction on the drum will retract its associated lever 24 sufficiently to exert a pull on the adjacent end of the cable 41 in a direction opposite to and counteracting the pull on the lever 24 produced by pressure of the operator's foot upon the brake operating lever 45. Thus as much greater pressure will be effected on the band exerting the less friction and as much less pressure will be effected on the band exerting the greater friction as will substantially equalize the friction between the different drums and their associated bands.

It is readily understood that the coefficient of friction between the frictionally engaging members 15, 30 does not depend solely upon the materials of which said members are constructed but depends somewhat upon the degree of smoothness of the friction surfaces and also upon the degree of dryness of said surfaces and, if moist, the character of the liquid upon said surfaces. Thus the coefficient of friction in the individual brakes will vary from time to time and the coefficient of friction for the different brakes may be different. From this it will be clear that the power applied to the brake bands will be automatically varied according to the coefficient of friction between the frictionally engaging members.

In setting the brakes while the vehicle is backing the drum, rotating in a direction opposite to that indicated by the arrow a, grips the brake band and tends to rotate said band in a direction to hold the ear 32 against the stud 20 and to move the block 27 away from said stud. The lever arm working against the block 27 is longer when the brake is set to oppose backing of the vehicle than when the vehicle is moving forward. Even though this is the case, the drum's rotation tending to lock the band to the drum effects a powerful braking action that is highly advantageous to prevent the vehicle from rolling backward down a grade when necessity demands that the vehicle stop while climbing the grade, and the longer lever arm enables the operator to tighten the band by movement thereof only in the direction of rotation of the drum.

A spring 52 serves to retract the lever 24. Mounted on the stud or anchor 20 is a retaining plate 53 pressed against the lever 24 by a coil spring 54 surrounding the stud between said plate and a washer 55. The washer 55 is retained on the stud by a cotter pin 56.

Now referring more particularly to the modified form of the invention illustrated in Figs. 11 and 12, the parts that correspond to those above described will be indicated by the same reference characters with the addition of a prime mark. These parts are the brake drum 15′, plate 16′, stud 20′, reinforcing plate 21′, shoulder 22′, brake band 30′, cable 41′, flexible sleeve 49′, spring 52′, retaining plate 53′, spring 54′, washer 55′, cotter pin 56′, and face plate 73′ having an orifice 74′.

The differentiating construction shown in Figs. 11 and 12 is as follows: Fulcrumed on the stud 20′ is a lever 57. To one end of the lever 57 are pivoted at 58 links 59 which in turn are pivoted at 60 to an ear 61 secured to one end of the brake band 30′.

Pivoted to the lever 57 at 62 is a link 63 carrying a threaded stud 64 which engages a turnbuckle 65. The turnbuckle 65 also engages a threaded stud 66 which is pivoted at 67 to an ear 68 secured to the other end of the brake band 30'. It is clear that by adjusting the turnbuckle 65 the opposite ends of the brake band may be moved toward or from each other. The lever 57 is retracted by the spring 52'.

Pivoted at 69 to the lever 57 is a clevis 70 secured to the cable 41' passing through the flexible sleeve 49'.

The operation of the modified form of the invention is similar to that described for the preferred form, for when the lever 57 is operated to expand the brake band the tendency is for said brake band to rotate in the direction of the arrow $b$ in Fig. 11, thus tending to retract the lever 57.

In the construction illustrated in Fig. 13 a brake-operating member 45' is mounted on a fulcrum 47' and is provided with a sleeve 76 having angularly disposed ends 77 turned in opposite directions. The cable corresponding with the cables 44 are joined into a single cable 44' which is slidable in the sleeve 76 so that, with this modified construction, operation of the brake-operating member 45' will cause equalization of the friction in all four brakes, thus making it possible to produce maximum braking effort for each wheel without danger of skidding.

The combination of the cable with the forms of brake herein described, when employed on the front wheels, has the advantage of effecting equal braking friction for said wheels regardless of the fact that said wheels are dirigibly mounted for steering of the vehicle.

At this point it may be noted that the sleeves 48 are friction tight on the cables 41 and may be adjusted by force to any desired position on said cables. Thus it is possible to change the relative leverage or pull of the cables 41 upon the levers 24 so that, if there is too great a difference in the friction components in the brakes on opposite sides of the vehicle for effective equalization with the cables 44 pulling on the centers of the cables 41, adjustment of the sleeves 48 to either side of said center may be made to effect greater leverage on the brake band having the poorer friction surface and to effect less leverage on the brake band having the better friction surface.

The construction hereinbefore described for holding the brake band retracted from the drum has this advantage over prior constructions employed for this purpose, that the springs 37 pull the brake band inwardly not only but also hold the band tightly against the inner face of the face plate 73, thus to exclude dirt and water from the interior of the drum. The springs 37 connect the plate 73 near its periphery with points on the band that are adjacent the edge of the band farthest from said face plate. Thus the pull of the springs toward the face plate is more direct than it is toward the axis of the drum, almost the entire available tension of the springs 37 acting to hold the band in contact with the face plate.

It should be especially noted that the simple operating mechanism described permits the cable 41 or its equivalent to be connected directly to a novel shiftable operating device at the brake, which permits the shifting of the band 30 or equivalent friction means so that it may anchor at one end when the drum is turning in one direction and at the other end when the drum is turning in the other direction, thus being at all times fully effective.

Placing the adjustment at the end of the band as described permits taking up for wear without making any adjustment either of the anchorage or of the operating mechanism.

While illustrative embodiments have been described in detail, it is not my invention to limit the scope of the invention to those particular embodiments, or otherwise than by the terms of the appended claims.

I claim:

1. The combination with two rotary members, of retarding means for each member, and a common means for applying power to said retarding means, said power-applying means including mechanism operating to distribute the applied power between said retarding means proportional to the amounts of frictional resistance between the rotary members and the retarding means to secure substantially equal retardation of said rotary members, together with a device for adjusting the retarding means to compensate for wear without affecting the operation of said mechanism.

2. The combination with two rotary members, of frictional braking means for each member, and a common means for applying power to said braking means, said power-applying means including mechanism operating to distribute the applied power between said retarding means proportional to the amounts of frictional resistance between the rotary members and the retarding means to effect equal amounts of friction in both braking means, together with a device for adjusting the retarding means to compensate for wear without affecting the operation of said mechanism.

3. The combination with two pairs of relatively moving members, of means retarding the relative movement between the members of each pair, and a common means applying power to the retarding means of both pairs of members, said power-applying means including mechanism operating automatically for transmitting the applied power to the retarding means to secure substantially equal retardation of the relative movement between the members of the two pairs, together with a fixed part to which the torque of the retarding means is transmitted through the power-applying means.

4. The combination with a pair of brake drums and a floating band for each drum, of pivotally mounted levers connected on opposite sides of their pivotal axes with the opposite ends of the brake bands, means connecting the levers, and means to operate the connecting means including a driver-operated member, said operating means permitting of movement of the connecting means by the levers without moving the said member, together with a fixed part adjacent each drum to which the braking torque is transmitted in either direction of rotation of said drum.

5. In a vehicle brake, the combination of a rotatable drum, a floating band to engage the drum, means to yieldingly hold the band retracted, and means operatable when the drum is rotating in one direction positively to hold one end of the band anchored throughout the operation of applying the brake and to move the other end in a direction corresponding to said direction of rotation of the drum.

6. In a vehicle brake, the combination of a rotatable drum, a floating band to engage the inner face of the drum, means to yieldingly hold the band contracted, and means operatable when the drum is rotating in one direction positively to hold one end of the band anchored throughout the operation of applying the brake and to move the other end away from the stationary end in a direction corresponding to said direction of rotation of the drum.

7. In a vehicle brake, the combination of a drum, a face plate of less diameter than the drum, a brake band inside of the drum, means yieldingly holding the band against the face plate, and means to expand the brake band.

8. A brake comprising, in combination, a drum, a fixed anchor member at one side of the drum, a floating expansible friction band-like device having separable ends between which the anchor member is arranged and which is arranged to anchor at one end on said member when the drum is turning in one direction and to anchor at the other end on said member when the drum is turning in the other direction, a floating applying device for forcing said ends apart to apply the brake, and an adjustable thrust member at one end of the friction device engaging the applying device and through which the braking torque is transmitted to the anchor member in one direction of drum rotation and which can be adjusted to compensate for wear of the friction device without affecting the anchorage or the applying device.

9. A brake comprising, in combination, a drum, a fixed anchor member at one side of the drum, a floating expansible friction band-like device having separable ends between which the anchor member is arranged, a floating applying device for forcing said ends apart to apply the brake, and an adjustable thrust member at one end of the friction device engaging the applying device and through which the braking torque is transmitted to the anchor member and which can be adjusted to compensate for wear of the friction device without affecting the anchorage or the applying device.

10. A brake comprising, in combination, a drum, a fixed anchorage, and a floating friction device anchoring thereon in one direction of drum rotation and having a part which is adjustable to compensate for wear and which transmits the torque to said anchorage in the other direction of drum rotation, which includes adjusting means for expanding the friction device to adjust the effective circumferential length, and applying means acting at least in part on the adjusting means so that the applying means is not affected by the adjustment.

11. A brake comprising, in combination, a drum, a fixed anchorage, a floating friction device having different parts anchoring thereon in opposite directions of drum rotation and which includes adjusting means for expanding the friction device to compensate for wear, and applying means acting at least in part on the adjusting means so that the applying means is not affected by the adjustment.

12. A brake comprising, in combination with a drum, floating friction means having one part which anchors when the drum is turning in one direction and a different part which anchors when the drum is turning in the other direction, at least one of said parts being adjustable to compensate for wear of the friction means.

13. A brake comprising, in combination with a drum, floating friction means having one part which anchors when the drum is turning in one direction and a different part which anchors when the drum is turning in the other direction, at least one of said parts being adjustable to compensate for wear of the friction means, together with brake-applying means acting on said two parts of the friction means.

14. A brake comprising, in combination, a drum, floating friction means within the drum and anchoring at one end when the drum is turning in one direction and at the other end when the drum is turning in the other direction, applying means wholly within the drum and acting on said ends and shiftable to allow the anchorage on either of said ends, and a flexible tension element directly connected to said applying means and permitting the shifting of the applying means and cooperating with the ends of the friction means to form the sole support for the applying means.

15. A brake comprising, in combination, a drum, floating friction means within the drum and having one part which anchors when the drum is turning in one direction and having a different part which anchors when the drum is turning in the other direction, applying means wholly within the drum and acting on said friction means and shiftable to allow the anchorage on either of said parts, and a flexible tension element directly connected to said applying means and permitting the shifting of the applying means and reacted on by the rotational tendency of the friction means.

16. A brake comprising, in combination, a drum, a support at the open side of the drum, friction means housed within the drum and between the drum and support and having one part which anchors when the drum is turning in one direction and a different part which anchors when the drum is turning in the other direction, applying means within the drum and shiftable to allow either of said parts to anchor, and a flexible tension element extending through the support into the drum and there connected to said applying means and cooperating with the ends of the friction means to form the sole support for the applying means.

17. A brake comprising, in combination, a drum, a support at the open side of the drum, friction means housed within the drum and between the drum and support, floating applying means wholly within the drum, and a flexible tension element extending through the support into the drum and there connected to said applying means and cooperating with the ends of the friction means to form the sole support for the applying means.

18. A brake comprising, in combination, a drum, a support at the open side of the drum, friction means housed within the drum and between the drum and support and having one part which anchors when the drum is turning in one direction and a different part which anchors when the drum is turning in the other direction, applying means within the drum and shiftable to allow either of said parts to anchor, a flexible conduit fixedly secured at its end to the support, and a flexible device extending through the conduit and inside of the drum beyond the conduit and there connected to said applying means.

19. A brake comprising, in combination, a drum, a support at the open side of the drum, friction means housed within the drum and between the drum and support, applying means within the drum, a flexible conduit fixedly secured at its end to the support, and a flexible device extending through the conduit and inside of the drum beyond the conduit and there connected to said applying means.

20. A brake for a swiveled wheel comprising, in combination, a drum rotating and swiveling with the wheel, a support at the open side of the drum swiveling but not rotating with the wheel, friction means acting on said drum and arranged within the drum, a flexible conduit secured to the support and permitting the swiveling of the wheel and having a section extending from said support approximately at right angles to the plane of the wheel, and a flexible operating element extending through the conduit into the interior of the drum and arranged to operate the friction means.

21. A brake for a wheel supporting a chassis frame comprising, in combination, a drum rotating with the wheel, a non-rotating support at the open side of the drum, friction means acting on said drum and arranged within the drum, a flexible conduit secured to the support at one end and to said frame at the other end, and a flexible operating element extending through the conduit into the interior of the drum and arranged to operate the friction means.

22. A brake comprising, in combination, a drum, friction means housed within and expansible against the drum, an applying device within the drum for expanding the friction means and which can shift bodily, and a flexible tension element extending through the open side of the drum into the interior of the drum and there connected to said applying device.

23. A brake comprising, in combination, a fixed member, friction means having separable ends and a floating applying device recessed at one side to fit over said fixed member when shifted in one direction and arranged to act on said ends, said device being unrestrained by said member when shifted in the opposite direction.

24. A brake comprising, in combination, a drum, a fixed member, friction means having separable ends and an applying device recessed to fit over said fixed member and disconnectedly engaging said ends, one of said ends anchoring through the applying device when the drum is turning in one direction and the other of said ends anchoring on the fixed member when the drum is turning in the other direction.

25. A brake comprising, in combination, friction means having separable ends, a fixed support arranged to take the torque of the friction means, and a floating rigid lever member directly engaging said ends and operable to pry them apart to apply the brake and which is capable of shifting bodily with respect to said support.

26. A brake comprising, in combination, a drum, friction means within the drum having separable ends, a fixed support arranged to take the torque of the friction means, and a rigid lever member having parts engaging said ends and an operating lever portion extending inwardly of the drum and which is operable to rock said parts in opposite directions to apply the brake, and which is capable of shifting bodily with respect to said support.

27. A brake member adapted for cooperation with a drum comprising a floating full-circumferential internal band having a plurality of thrust members, in combination with a drum and an anchorage member taking the torque from one of the thrust members when the drum is turning in one direction and from the other thrust member when the drum is turning in the other direction, at least one of said members being adjustable to compensate for wear of the brake member.

28. A brake member adapted for cooperation with a drum comprising a floating full-circumferential internal band having at its opposite ends thrust members, in combination with a drum and an anchorage member taking the torque from one of the thrust members when the drum is turning in one direction and from the other thrust member when the drum is turning in the other direction, at least one of said members being adjustable to compensate for wear of the brake member.

29. A brake comprising, in combination, a drum, a floating friction device within the drum anchoring at one end when the drum is turned in one direction and anchored at the other end when the drum is turned in the other direction, and means for applying the friction device to the drum such that in at least one direction of rotation of the drum the corresponding end of the friction device is definitely maintained anchored throughout the operation of applying the brake.

30. A brake comprising, in combination, a drum, a floating friction device within the drum anchoring at one end when the drum is turned in one direction, and anchored at the other end when the drum is turned in the other direction, and means for applying the friction device to the drum such that in one direction of rotation of the drum the end of the friction device is definitely maintained anchored throughout the operation of applying the brake, while in the other direction of drum rotation the drum friction shifts the anchorage to the other of said ends.

Signed at Los Angeles, California, this 2d day of August, 1922.

ROY S. SANFORD.